(12) United States Patent
Charbonnel et al.

(10) Patent No.: US 11,542,849 B1
(45) Date of Patent: Jan. 3, 2023

(54) METHOD AND SYSTEM FOR DETERMINING INTERNAL TEMPERATURE OF A MID-BRICK CATALYST FOR MACHINE CONTROL

(71) Applicant: Caterpillar Inc., Peoria, IL (US)

(72) Inventors: Sylvain J. Charbonnel, Peoria, IL (US); James H. Mutti, Jr., Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/448,010

(22) Filed: Sep. 17, 2021

(51) Int. Cl.
*F01N 9/00* (2006.01)
*F02D 41/02* (2006.01)
(Continued)

(52) U.S. Cl.
CPC ......... *F01N 9/005* (2013.01); *F01N 3/2033* (2013.01); *F01N 11/005* (2013.01); *F02D 41/024* (2013.01); *F01N 3/103* (2013.01); *F01N 3/106* (2013.01); *F01N 3/36* (2013.01); *F01N 2430/06* (2013.01); *F01N 2560/06* (2013.01); *F01N 2610/03* (2013.01); *F01N 2610/1453* (2013.01);
(Continued)

(58) Field of Classification Search
CPC .......... F01N 3/035; F01N 3/103; F01N 3/106; F01N 3/2033; F01N 3/36; F01N 9/005; F01N 11/005; F01N 2430/06; F01N 2560/06; F01N 2610/03; F01N 2610/1453; F01N 2900/0404; F01N 2900/0408; F01N 2900/0412; F01N 2900/0601; F01N 2900/1404; F01N 2900/1602; F02D 41/024; F02D 2200/0804

USPC ......... 60/274, 285, 286, 295, 297, 300, 303, 60/320
See application file for complete search history.

(56) References Cited

U.S. PATENT DOCUMENTS 7,832,200 B2    11/2010   Kesse et al.
8,146,351 B2    4/2012    Li et al.
(Continued)

FOREIGN PATENT DOCUMENTS

CN       108762334 B        9/2020
DE    102019104329 A1 *     8/2019
(Continued)

*Primary Examiner* — Jorge L Leon, Jr.
(74) *Attorney, Agent, or Firm* — Bookoff McAndrews, PLLC (57) ABSTRACT

Systems and methods for controlling a regeneration process of catalyst(s) are disclosed. The method includes receiving, via Kalman filter, initial estimation from a previous instance of time. The initial estimation includes one or more first estimated inside temperature(s) and/or first estimated outlet temperature of A/T catalyst. An output from a simulation model may be generated to calculate a mean and covariance. Sensor measurement covariance may be compared against the mean and covariance of the output to update Kalman filter gain and process covariance. A weighted average may be calculated between sensor measurements and mean of the output to generate a second estimation for the next instance of time, wherein weight is based on Kalman filter gain. The second estimation includes one or more second estimated inside temperature(s) and/or second estimated outlet temperature of A/T catalyst to control the mass flow rate in diesel engine via a closed loop control system.

20 Claims, 4 Drawing Sheets

(51) Int. Cl.
    *F01N 11/00*     (2006.01)
    *F01N 3/20*     (2006.01)
    *F01N 3/10*     (2006.01)
    *F01N 3/36*     (2006.01)

(52) U.S. Cl.
    CPC ................ *F01N 2900/0404* (2013.01); *F01N 2900/0408* (2013.01); *F01N 2900/0412* (2013.01); *F01N 2900/0601* (2013.01); *F01N 2900/1404* (2013.01); *F01N 2900/1602* (2013.01); *F02D 2200/0804* (2013.01)

(56) References Cited

U.S. PATENT DOCUMENTS

| | | |
|---|---|---|
| 9,506,390 B1 | 11/2016 | Hendrickson et al. |
| 9,779,218 B2 | 10/2017 | Hehle et al. |
| 2019/0271254 A1 | 9/2019 | Frobert et al. |

FOREIGN PATENT DOCUMENTS

| | | |
|---|---|---|
| DE | 102019104329 A1 | 8/2019 |
| KR | 102172839 B1 | 11/2020 |
| WO | 2021026317 A1 | 2/2021 |

\* cited by examiner

METHOD AND SYSTEM FOR DETERMINING INTERNAL TEMPERATURE OF A MID-BRICK CATALYST FOR MACHINE CONTROL

TECHNICAL FIELD

The present disclosure relates generally to systems for internal combustion engine control, and more particularly, to methods and systems for determination of internal temperature for machine control, e.g., for an exhaust treatment system of an internal combustion engine.

BACKGROUND

The exhaust gas of diesel engines generally contain particles, e.g., coal or soluble organic substances, which causes environmental pollution. To reduce emissions of such particles, an emissions treatment device may be disposed in the exhaust system of the engine, e.g., filters and After-Treatment (A/T) catalysts (diesel oxidation catalyst (DOC), diesel particulate filters (DPF), selective catalytic reduction (SCR), ammonia oxidation catalysts (AMOx), lean NOx traps (LNT), etc.), that generally operate by physically trapping the emission products or by chemically reacting with the emission products to convert them to other forms that may be addressed more readily. In one example, a DPF may be installed in the exhaust gas flow path to trap the particles from being discharged into the atmosphere. In some instances a regeneration process may be performed on the DPF, e.g., to remove an accumulation of particles that may at least partially clog the DPF. In various instances, regeneration may be utilized for one or more of a variety of reasons, e.g., desulfation, hydrocarbon (HC) removal, deposit removal, etc.

Regeneration may be accomplished by oxidizing, e.g., burning off the accumulation trapped in the device, which typically involves increasing the temperature and/or causing combustion to occur inside the device. When the DPF is regenerating, fuel may be injected late in an expansion stroke of the engine so that the fuel does not combust in the engine, but rather is exhausted to the A/T where it may burn and produce heat for regenerating, i.e., an In-Cylinder Dosing (ICD) process. In one example, the amount of ICD fuel to inject may be based on a closed-loop control system. It should be noted that fuel may be injected in a variety of ways other than via the ICD process, e.g., an injector configured to inject fuel into the exhaust system (such as a "seventh" injector in a six-injector engine).

Generally, such a closed-loop system utilizes a temperature sensor placed at the outlet of the fuel burning catalyst. However, using a closed-loop control system with a sensor at the outlet of the catalyst, e.g., a DOC outlet and/or a DPF outlet, may be sub-optimal. For example, if the thermal mass of the fuel burning catalyst brick is large, placing a closed-loop control system on a sensor at the outlet of such brick may result in a lagging measurement that drastically reduces the stability of the controller and may result in unstable regeneration. For example, hydrocarbon or soot accumulated in the DPF may combust during regeneration, and such rapid incineration increases the temperature faster than may be sensed by the control system via the outlet temperature sensor. As the filter temperature increases, soot oxidation rates increase, resulting in the production of enough heat from the exothermic reaction to further increase the soot oxidation rate. This uncontrolled exothermic reaction during regeneration may result in temperatures that are high enough to melt, crack, or otherwise damage the DPF filter.

A control method and control device for DOC downstream temperature is disclosed in the Chinese Patent Number 108762334 B to Guopeng et al. ("the '334 patent"). The method described in the '334 patent includes dividing DOC into N blocks, calculating an outlet exhaust temperature of the N DOC according to a heat balance equation, and inputting the outlet exhaust temperature into a Kalman filter for estimating outlet exhaust temperature. While the method described in the '334 patent may be useful in some circumstances, it may experience difficulties when A/T catalysts have a higher thermal mass that results in delayed and inaccurate sensor readings. Furthermore, the '334 patent is unable to accurately predict internal virtual temperature of an A/T catalyst.

The disclosed method and system may solve one or more of the problems set forth above and/or other problems in the art. The scope of the current disclosure, however, is defined by the attached claims, and not by the ability to solve any specific problem.

SUMMARY

In one aspect, an exemplary embodiment of for controlling a regeneration process of a catalyst for a diesel engine includes iterative steps of: receiving, via a Kalman filter, an initial estimation from a previous instance of time, wherein the initial estimation includes one or more first estimated inside temperature(s), a first estimated outlet temperature, or a combination thereof of an after-treatment (A/T) catalyst; generating an output from a simulation model, and calculating a mean and a covariance from the output; comparing sensor measurement covariance against the mean and the covariance of the output to update a Kalman filter gain and a process covariance; calculating a weighted average between sensor measurements and the mean of the output to generate a second estimation for a next instance of time, wherein weight is based on the Kalman filter gain, and wherein the second estimation includes one or more second estimated inside temperature(s), a second estimated outlet temperature, or a combination thereof of the A/T catalyst; and controlling, a mass flow rate of fuel in the diesel engine for the regeneration process, via a closed loop control system, based on the second estimation.

In another aspect, an exemplary embodiment of an engine control system for an engine may include a temperature sensor and an engine controller. The temperature sensor may be configured to sense an inlet temperature and an outlet temperature of an after-treatment (A/T) catalyst. The engine controller may be operatively connected to the temperature sensor, and may include a memory and a processor operatively connected to the memory. The memory may store one or more instructions for controlling a regeneration process of an engine based on an estimated inside temperature, wherein the estimated inside temperature is implemented for operating condition of the engine at a next instance of time. The processor may be configured to execute the instructions the one or more instructions to perform operations including the regeneration process of a catalyst, comprising iterative steps of: in real-time, receive, via a Kalman filter, an initial estimation from a previous instance of time, wherein the initial estimation includes one or more first estimated inside temperature(s), a first estimated outlet temperature, or a combination thereof of an after-treatment (A/T) catalyst; in response to the initial estimation, generate an output from a simulation model, and calculate a mean and a covariance from the output; in response the mean and the covariance of the output, compare sensor measurement covariance against the mean and the covariance of the output to update a Kalman filter gain and a process covariance; in response to the comparison, calculate a weighted average between sensor measurements and the mean of the output to generate a second estimation for a next instance of time, wherein weight is based on the Kalman filter gain, and wherein the second estimation includes one or more second estimated inside temperature(s), a second estimated outlet temperature, or a combination thereof of the A/T catalyst; and in response to the second estimation, control a mass flow rate of fuel in a diesel engine for the regeneration process, via a closed loop control system, based on the second estimation.

In a further aspect, an exemplary embodiment of an engine system for a vehicle may include a diesel engine, an exhaust treatment system, and an engine controller. The exhaust treatment system may include a diesel oxidation catalyst (DOC) and a diesel particulate filters (DPF), and one or more temperature sensors operatively connected to an inlet and an outlet of the DOC and the DPF. The engine controller may include instructions for controlling the engine based on an estimated inside temperature, wherein the estimated inside temperature is implemented to control quantity of fuel injected into a fuel burning catalyst at a next instance of time, wherein the fuel burning catalyst includes DOC. The engine controller may include a processor that may be operatively connected to the memory, and may be configured to execute the instructions to perform operations that include a regeneration process of a catalyst for, comprising iterative steps of: receiving, via a Kalman filter, an initial estimation from a previous instance of time, wherein the initial estimation includes one or more first estimated inside temperature(s), a first estimated outlet temperature, or a combination thereof of an after-treatment (A/T) catalyst; generating an output from a simulation model, and calculating a mean and a covariance from the output; comparing sensor measurement covariance against the mean and the covariance of the output to update a Kalman filter gain and a process covariance; calculating a weighted average between sensor measurements and the mean of the output to generate a second estimation for a next instance of time, wherein weight is based on the Kalman filter gain, and wherein the second estimation includes one or more second estimated inside temperature(s), a second estimated outlet temperature, or a combination thereof of the A/T catalyst; and controlling, a mass flow rate of fuel in the diesel engine for the regeneration process, via a closed loop control system, based on the second estimation.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Controlling the injection of fuel for a regeneration process based on the DPF outlet temperature may not be a suitable solution. For example, an A/T catalyst with higher thermal mass generally causes delayed sensor measurements that may reduce the stability of an engine system. One approach may be to calculate one or more inside temperature(s) of the A/T catalyst, i.e., mid-brick temperature, e.g., via a simulation model that simulates the dynamics of the A/T catalyst. However, a simulation model of a catalyst for calculating the inside temperature and the outlet temperature of the A/T catalyst may not maintain accuracy over time, e.g., when operating conditions or performance change over time, and thus may not be an optimal solution. A Kalman filtering technique is proposed below that uses the calculations from the simulation model and the measurements from the sensors to predict the inside temperature that is more accurate than the calculation of the simulation model. In one embodiment, the system implements an inner-outer loop architecture, wherein the inner loop may use the Kalman filter corrected prediction of the internal brick vs. an internal brick temperature target, and the outer loop may compare the Kalman filter corrected prediction of the outlet temperature with the regeneration temperature target to ensure regeneration is achieved by adjusting the inner loop temperature target.

Figure 1:
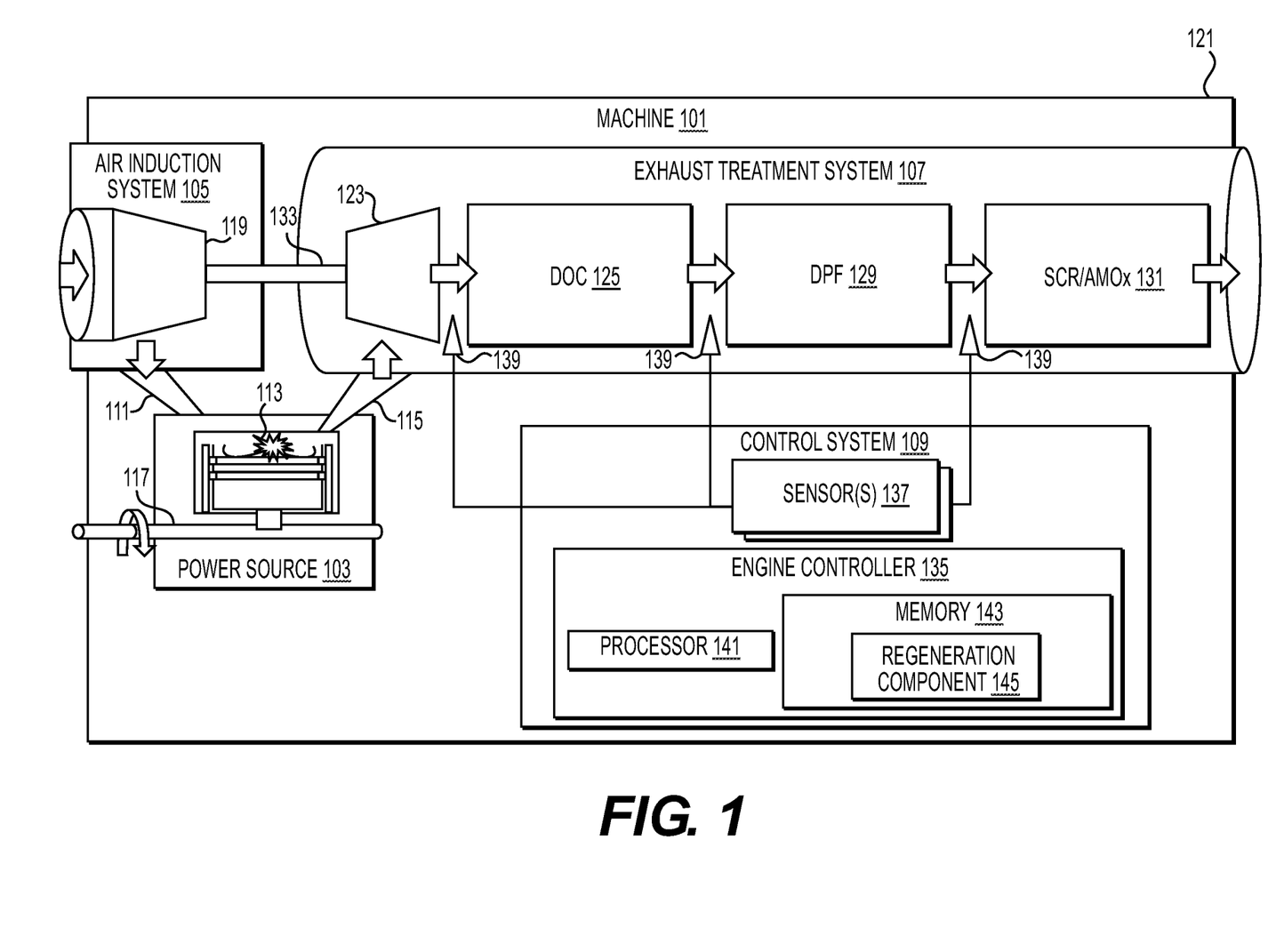
FIG. 1 is a partially schematic view of a machine including a power source controlled by an engine controller, according to aspects of the present disclosure.

FIG. 1 illustrates an exemplary machine 101 having multiple systems and components that may operatively cooperate to accomplish a task. Machine 101 may perform various operations associated with an industry such as mining, construction, farming, transportation, power generation, or any other suitable industry. For example, machine 101 may be a mobile machine such as an on-highway vocational vehicle, an off-highway haul truck, an excavator, a dozer, a loader, a motor grader, or any other industrial moving machine. Machine 101 may alternatively be a stationary machine such as a generator set, a furnace, or another suitable stationary machine. Machine 101 may include a power source 103, an air induction system 105, an exhaust treatment system 107, and a control system 109.

In one aspect, power source 103 may include a combustion engine having multiple subsystems that operatively interact to produce mechanical power output. Power source 103 may include, for example, inlet 111 for receiving fuel and/or air, combustion chamber 113 for combusting a mixture of fuel and air, outlet 115 for exhausting a flow of exhaust gas, and power output member 117 for outputting the mechanical power resulting from the combustion. In this aspect, power source 103 is a diesel engine. However, it should be understood that power source 103 may be any other suitable type of combustion engine such as, for example, a gasoline or a gaseous fuel-powered engine, or combinations thereof. The multiple subsystems included in power source 103 may include, for example, a fuel system, a lubrication system, a cooling system, a drive system, a guidance system, or any other appropriate system (not shown).

In one aspect, air induction system 105 may include one or more components that condition and introduce compressed air into combustion chamber 113 of power source 103. For example, air induction system 105 may include compressor 119. In various embodiments, air induction system 105 may include different and/or additional components than described above such as, for example, an air filter, an air cooler, inlet bypass components, and other known components (not shown).

In one aspect, compressor 119 may be configured to compress the air flowing into inlet 111 of power source 103. Compressor 119 may have a fixed geometry type, a variable geometry type, or any other suitable geometry type. In some aspects, a plurality of compressors may be arranged in series and/or in parallel within air induction system 105.

In one aspect, exhaust treatment system 107 may be configured to treat and direct the flow of the exhaust gases from outlet 115 of power source 103 to atmosphere 121. For example, exhaust treatment system 107 may include turbine 123 and one or more after-treatment components, such as, DOC 125, DPF 129, and Selective Catalyst Reduction element with an Ammonia Oxidation Catalyst ("SCR/AMOx") 131. It should be understood that these components of exhaust treatment system 107 are exemplary only, and that additional and/or different components may be included in various embodiments. The location of each catalyst may be changed without limiting the scope of the present disclosure. Turbine 123 may be operatively connected to power source 103 to receive the exhaust gasses flowing from outlet 115 of power source 103, and may be configured to drive compressor 119. For example, as exhaust gases exhausted from power source 103 expand against blades (not shown) of turbine 123, turbine 123 may rotate common shaft 133 to drive compressor 119. In various embodiments, a plurality of turbines may be included in parallel or in series within exhaust treatment system 107.

In one aspect, control system 109 may include one or more components that cooperate to monitor the operation of air induction system 105, exhaust treatment system 107, and power source 103. In particular, control system 109 may be configured to sense one or more operating conditions of machine 101, and, in response to the sensed operating conditions, perform one or more estimations, calculations, modellings, or the like for control of machine 101. Control system 109 may include, for example, engine controller 135 and sensors 137.

In one aspect, engine controller 135 may be operatively connected to sensors 137 and/or other components of machine 101. Engine controller 135 may include one or more processors 141 and one or more memory 143. Various other suitable components, e.g., power supply circuitry, signal conditioning or processing circuitry, or the like, may also be included in engine controller 135 in various embodiments. Although depicted as a single element in FIG. 1, it should be understood that engine controller 135, in some embodiments, may be distributed over a plurality of elements in any suitable arrangement. Engine controller 135 may maintain a record of the operating parameters measured by one or more of the sensors 137.

Machine 101 may include multiple sensors configured to detect operating parameters of exhaust treatment system 107. In one aspect, one or more sensors 137 may include a temperature sensor to sense an ambient temperature, a temperature of the exhaust gas, or the like. In one aspect, the temperature sensor may include an exhaust gas temperature sensor that measures the temperature of the exhaust gas output from the engine, and/or an intake manifold air temperature (IMAT) sensor that measures the temperature of the air passing through an intake manifold (not shown) of the engine. In one aspect, one or more sensors 137 may include one or more after-treatment sensors, e.g., temperature/pressure sensor 139 disposed at an outlet of DOC 125 and DPF 129. These sensors may be configured to measure the temperature and/or pressure of exhaust entering and/or exiting DOC 125 and DPF 129. Other pressure sensors that may be included are, for example, an ambient pressure sensor of atmosphere 121, a pressure sensor at inlet 111, at outlet 115, or the like (not shown). In one aspect, one or more sensors 137 may include one or more position or speed sensors, e.g., to sense a position and/or speed of one or more components of machine 101 and/or of machine 101 itself. Any suitable type of sensor, and any suitable arrangement of one or more sensors 137, may be used. Generally, a sensor may be configured to generate a signal indicative of a value associated with an operating condition of machine 101, e.g., that may be received and interpreted by engine controller 135 and/or other components of machine 101.

In one aspect, memory 143 of engine controller 135 may store data and/or software, e.g., instructions, models, algorithms, equations, data tables, or the like, that are usable and/or executable by processor 141 to perform one or more operations for controlling machine 101. For example, engine controller 135 may be configured to receive input, e.g., from an operator of machine 101 and/or any other suitable source, and generate engine commands based on the input. In one aspect, engine controller 135 may be configured to generate the engine commands based on one or more operating conditions of machine 101, e.g., as indicated by one or more sensors 137. For example, memory 143 may include an optimizer (not shown) that, when executed by processor 141, is configured to generate engine commands that optimize the operation of machine 101. In another aspect, the memory may include a regeneration component 145 that, when executed by processor 141, is configured to operate the machine 101 to perform a regeneration process, e.g., via an ICD process, by operating an injector (not shown) configured to inject fuel into the A/T system 107, or any other suitable technique. As discussed in more detail below, such operation e.g., the amount/rate of fuel to be injected into the A/T system 107 may be controlled by the processor 141 based on, for example, the one or more sensors 139 and/or output from one or more simulations or models within memory 143.

In one aspect, A/T catalysts of exhaust treatment system 107 may accumulate, soot, sulfur, deposit, hydrocarbons, or the like over time that results in varying restrictions of the exhaust system or other effects that may deteriorate engine performance, e.g., over time. Generally, a regeneration process is performed, e.g., periodically or in response to a sensed operating condition of the A/T catalysts. Conventionally, such a process is performed via a closed-loop control system in which a temperature sensor used for feedback is placed at the outlet of the fuel burning catalyst, e.g., an outlet of the DOC or at an outlet of the DPF, and so on. However, such placement may not be an optimal solution. Such placement may result in feedback that is based on a lagging measurement, and may drastically reduce the stability of a controller. In other words, the temperature sensed at the outlet of the fuel burning catalyst is generally a lagging indicator relative to the internal, e.g., midpoint, temperature of the catalyst.

Disclosed herein are systems and methods to control the quantity of fuel and/or oxidant that is sent to a catalyst during a regeneration process based on an internal virtual temperature of the catalyst by a close-loop control system. Further details of these and other techniques are provided below.

Figure 2:
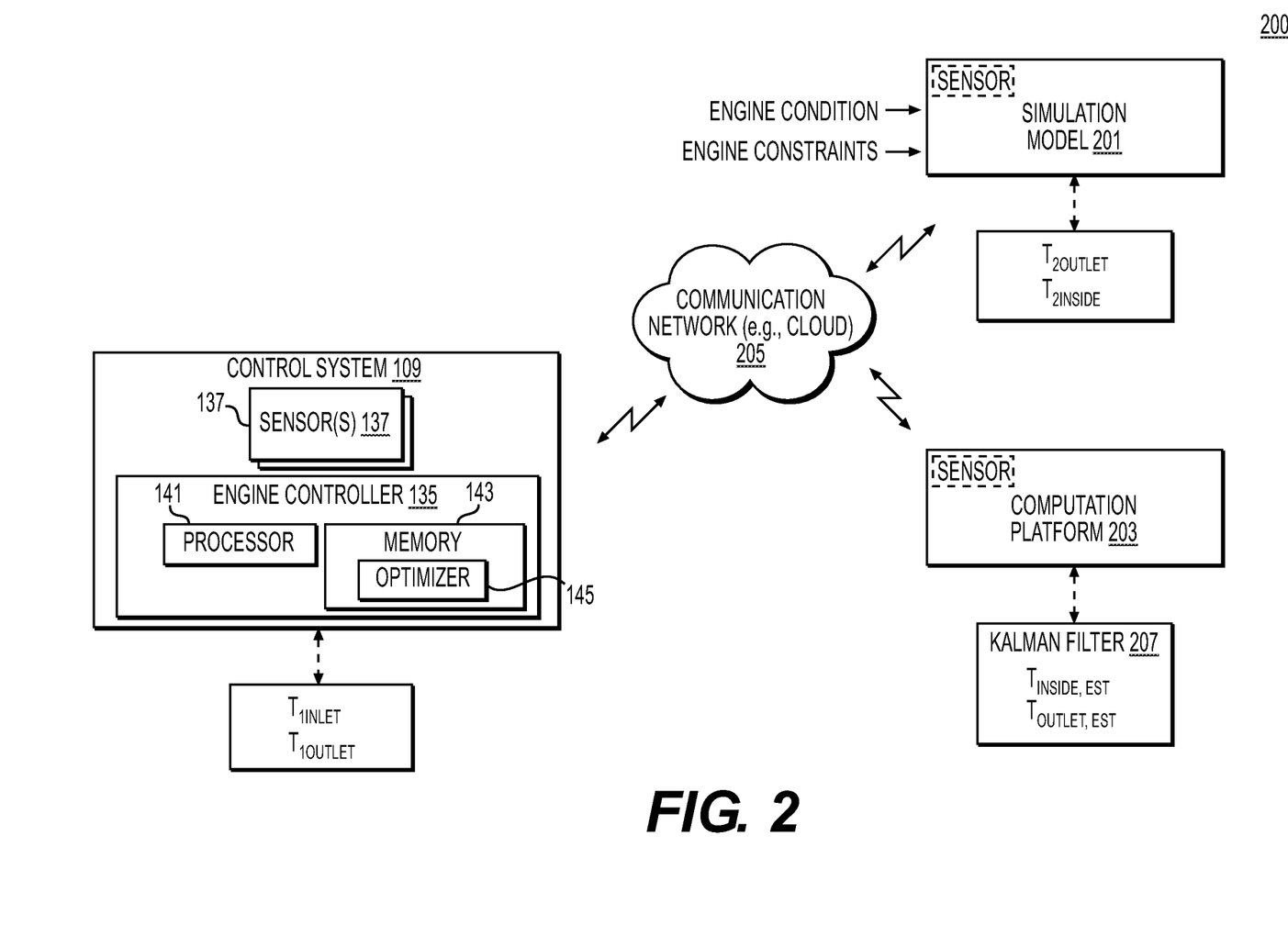
FIG. 2 is a diagram of a system for controlling an engine based on an internal temperature of a catalyst brick of an exhaust treatment system, according to aspects of the present disclosure.

FIG. 2 is a diagram of a system for predicting an internal virtual temperature of a catalyst brick of an exhaust treatment system to control the operation of an engine, e.g., such as the machine 101 in FIG. 1, according to aspects of the present disclosure. As shown in FIG. 2, system 200 comprises control system 109, e.g., of machine 101, simulation model 201, and computation platform 203, which may communicate via communication network 205. Though depicted as separate entities in FIG. 2, it is contemplated that simulation model 201 and computation platform 203 may be implemented for direct operation by control system 109 of machine 101 and/or at least partially integrated therein. It is contemplated that the functions of these components may be combined in one or performed by other components of equivalent functionality. Any suitable arrangement, combination, or distribution of the components in FIG. 2 may be used.

In one aspect, a programming system may include a simulation model 201 that executes a catalyst(s) thermal model, e.g., a model that predicts the temperature field vs. time through a fuel burning catalyst. Simulation model 201 may include any suitable software, computational device, computing system, or a program in memory 143 for simulating the temperature profile within catalyst(s).

In one aspect, simulation model 201 may receive inputs, e.g., measurements $T_{1inlet}$ and $T_{1outlet}$ from sensors 137, from control system 109 of machine 101 via communication network 205. The measured sensor data may be used and/or manipulated by mathematical methods, algorithms, models, or the like to adapt them to a specific simulation model. Simulation model 201 may use these measured sensor data for the calculation of simulation parameters.

In one embodiment, simulation model 201 is based on the $1^{st}$ law of thermodynamic. Simulation model 201 may implement various types of equations, e.g., based upon the $1^{st}$ law of thermodynamics, to model processes in the catalyst(s) thermal model. For example, simulation model 201 may utilize various mass flow rates (such as the mass flow rate at the inlet of an exhaust system, the mass flow rate at the middle of an exhaust system, the mass flow rate at the outlet of an exhaust system, or the like), various temperatures, e.g., as sensed by one or more of the sensors 139 (such as the temperature at the inlet of an exhaust system, the temperature at the outlet of an exhaust system, or the like), various thermal properties of elements or substances in the machine 101 (such as the heat capacity of a catalyst brick, the heat capacity of exhaust gas at constant pressure, or the like), and/or other properties as well as relationships between such properties, e.g., the $1^{st}$ law of thermodynamic to model the thermodynamic behavior of the catalyst(s). The simulation model 201 may be configured, for example, to generate various outputs, such as temperature information of the simulated catalyst(s), e.g., outlet temperature ($T_{2outlet}$) of a catalyst brick, one or more inside temperature(s) of a catalyst brick such as a mid-temperature ($T_{2inside}$) of a catalyst brick or temperatures at other locations within the brick. Simulation model 201 may transmit the outlet temperature ($T_{2outlet}$), the one or more inside temperature ($T_{2inside}$), etc., or a combination thereof of a catalyst brick to another component of the machine, e.g., the computation platform 203. It should be noted simulation model 201 may perform calculations on the received sensor measurements in accordance with various equations without any limitation.

In one aspect, computation platform 203 may be a platform with multiple interconnected components. Computation platform 203 may include multiple servers, intelligent networking devices, computing devices, components, and corresponding software for providing one or more estimated inside temperature of a catalyst brick of an exhaust treatment system. In one aspect, computation platform 203 may be a part of control system 109 or a separate entity of system 200. Computation platform 203 may be implemented in hardware, firmware, software, or a combination thereof. In another aspect, computation platform 203 may be implemented as a cloud-based service, local service, native application, or combination thereof. In one aspect, computation platform 203 may receive outlet temperature ($T_{2outlet}$) and one or more inside temperature(s) ($T_{2inside}$) from simulation model 201 via communication network 205.

Computation platform 203 may be configured to implement Kalman filtering techniques, e.g., to predict one or more estimated inside temperature(s) ($T_{inside,est}$) and an estimated outlet temperature ($T_{outlet,est}$) of a catalyst brick, e.g., DOC 125 or DPF 129 of exhaust treatment system 107. For example, the computation platform 203 may include a model, algorithm, or the like that implements Kalman filter 207, e.g., whereby the Kalman filtering techniques may include: generating sigma points around one or more inside temperature estimation(s) from a previous iteration and feeding the sigma points to a simulation model for determining a model temperature. A mean and covariance of outputs from simulating the sigma points may be used for determining a model temperature, and sensor measurements may be compared with the model temperature to update a Kalman filter gain and/or a process covariance. The sensor measurements may be weighted against the mean with the Kalman filter gain to generate one or more new inside and one outlet temperature estimation. Further aspects of Kalman filtering techniques are discussed in further detail below. Although Kalman filtering techniques are discussed with regard to various embodiments, other known filtering methods may also be used.

Sensors often have a noise factor or uncertainty associated with their measurement, and if uncorrected, measurement uncertainty may accumulate. The correction mechanism in Kalman filter 207 may be usable to minimize these uncertainties at each time step and reduce a degradation of accuracy over time. In one aspect, the Kalman filter 207 has a mathematical basis in statistics, probabilities, and system modeling to recursively predict the one or more estimated inside temperature(s) ($T_{inside,est}$) and the estimated outlet temperature ($T_{outlet,est}$) of a catalyst brick. This is very useful because the inside temperature of a catalyst is unknown or cannot be directly measured. In one aspect, computation platform 203 may employ an unscented Kalman filter (UKF) that estimates the state variables of a nonlinear system by calculating the mean. Such a filter may use unscented transform (UT), a method for statistically calculating a stochastic variable that goes through a nonlinear transformation. Similar to the Kalman filter, applying, the UKF may include a prediction step and an update step.

In one aspect, UKF may produce several sampling points (e.g., sigma points) around a current state estimate, e.g., based on a covariance of the sampling points. In one aspect, a frequency of sigma points grows with the dimensionality of the problem, i.e., the number of states. One of the sigma points selected in the UKF is a prior mean and other points are selected to have symmetry around the prior mean. A weighting factor may be associated with each point selected in the UKF, and the sum of the weighting factor may add to 1. Such sigma points may be propagated through a nonlinear map, e.g., the catalyst(s) thermal models, to get an accurate estimation of the mean and covariance of the mapping results. A Gaussian distribution may be formed as an approximation to the true distribution.

In one aspect, given inputs, e.g., a measurement from one of the sensors 139 and the current state estimate such as one or more of the outputs from the simulation model 201, UKF may calculate a Kalman gain, i.e., a relative weight given to the measurements and current state estimate, to weight between the measurement and the output(s) of the simulation model 201. The Kalman gain may favor either the actual measurement or the model, e.g., based on relative uncertainties of each. In other words, with a high gain, the UKF may place more weight on the measurement, and with a low gain, the UKF may place more weight instead on the model predictions.

Machine 101 includes a control system 109 with engine control units that assist with the control of the engine. These control units often operate in conjunction with sensors that detect the operating conditions of the engine. In one aspect, control system 109 of the machine 101 receives, in real-time, the estimated one or more inside temperature(s) ($T_{inside,est}$) of a fuel burning catalyst brick, e.g., DOC 125 or DPF 129, of exhaust treatment system 107. Thereafter, control system 109 may control the fuel mass flow rate used for the regeneration process based on the one or more estimated inside temperature(s) ($T_{inside,est}$), e.g., so that the inlet temperature of the fuel burning catalyst (e.g., DOC or the DPF, or other) moves toward a desired temperature.

In one embodiment, communication network 205 of system 200 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, control system 109 has connectivity to model 201 and computation platform 203 over communication network 205. By way of example, the computation platform 203, control system 109, and simulation model 201 communicate with each other using well-known, new or still developing protocols. In this context, a protocol includes a set of rules defining how the network nodes within communication network 205 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

INDUSTRIAL APPLICABILITY

Engine controller 135, such as those described in one or more of the embodiments above, that is configured to dynamically adjust fuel dosage of machine 101 for performing regeneration based on one or more estimated inside temperature(s), may be used in conjunction with any appropriate machine, vehicle, or other device or system that includes an internal combustion engine having one or more components with behavior that may vary over time during operation, and in particular, that may vary not due to a fault or degradation, but rather to circumstances that accumulate or change over time.

Engine controller 135 utilizing one or more estimated inside temperature(s) may be applied, for example, to internal combustion engines that have components whose behavior may change due to, for example, degradation, mass of the A/T catalyst, accumulation of ash, soot, ice, moisture, or the like. Such an engine controller 135 may be used in conjunction with regeneration component 145 configured to generate engine commands that optimize the operation of a machine. Such engine controller 135 may be used in conjunction with various types of engines and fuel systems, such as engines with common rail diesel fuel injection, unit diesel fuel injection, dual fuel injection (e.g., diesel and gaseous fuel), or gaseous fuel injection. Engine controller 135 may also be applied in a variety of machines or vehicles, including machines applicable for earthmoving, paving, power generation, mining, marine applications, transportation, or others.

In machines including an internal combustion engine with an exhaust treatment system, it may be desirable to control exhaust gas temperature, e.g., to facilitate a regeneration process and/or to reduce the possibility of damage to filters due to high temperatures. It may be beneficial to account for a variance in a temperature of an operating condition of the machine, e.g., a variance between a temperature that may be captured by a sensor and a further temperature such as an internal temperature of an element that it may be difficult or impossible to capture via a sensor. It may be beneficial to account for such variance over the course of operation and/or in real-time. It may be beneficial to dynamically adjust the operation of the machine using a Kalman filter estimation that takes multiple instances of sensor data to make predictions. While several examples discussed elsewhere pertained to Kalman filter for DPF or filter regeneration, it should be noted that one or more aspects of this disclosure, e.g., one or more Kalman filter techniques may be used in any suitable situation, e.g., to actively close-loop control a temperature. Illustrative examples that are contemplated herein include, but are not limited to evaporation of HC from DOC, removal of DEF deposit from piping, removal of Sulphur from SCR, etc. One or more aspects of this disclosure may be adapted to any suitable system or machine applying closed-loop control using temperature and/or any other property measurable by a sensor.

Figure 3:
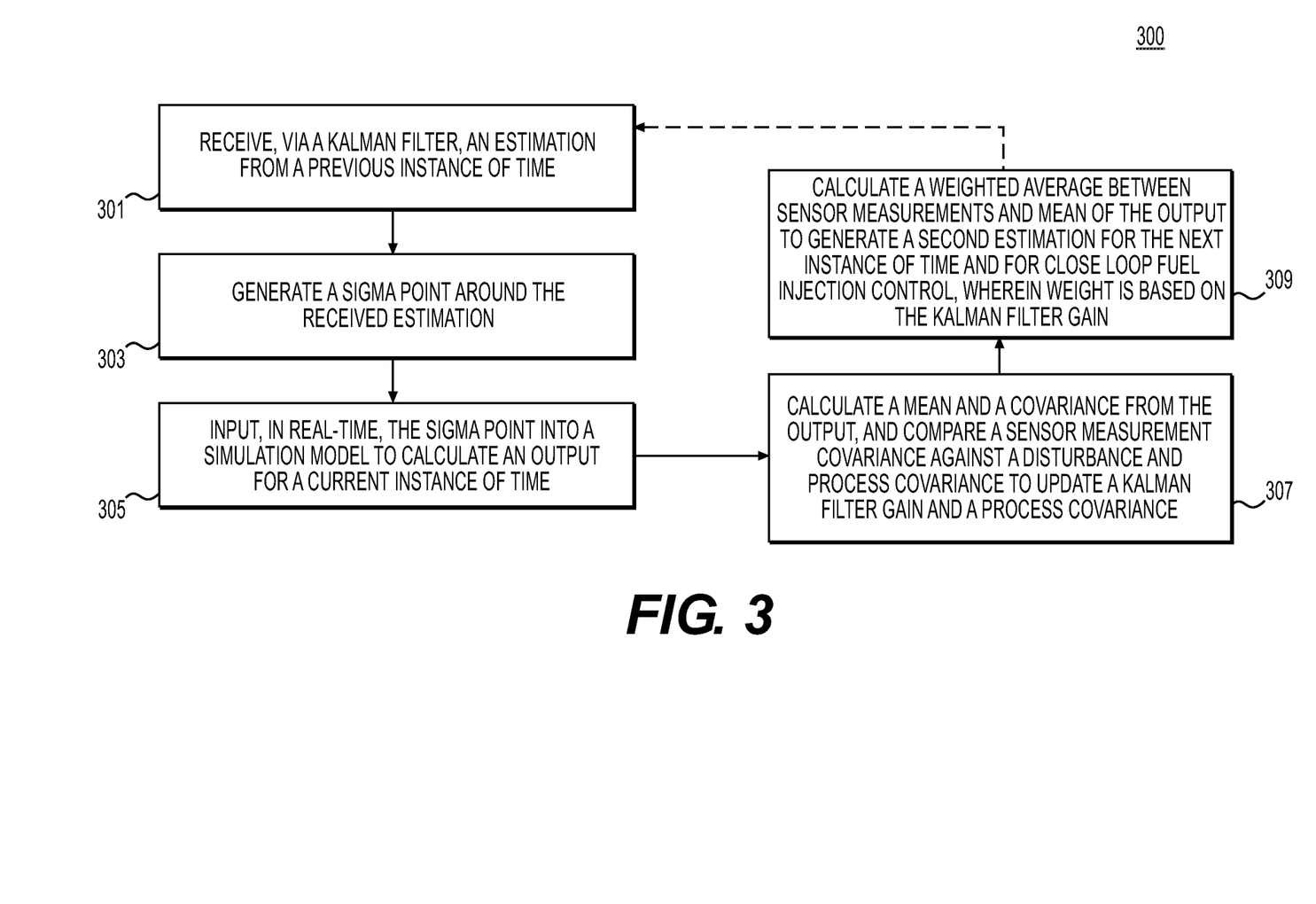
FIG. 3 is an iterative flowchart of a method for predicting an internal temperature estimate of a catalyst brick, according to aspects of the present disclosure.

FIG. 3 is an iterative flowchart illustrating an exemplary method 300 for operating machine 101 according to one or more embodiments of this disclosure. While certain operations are described as being performed by certain components, it should be understood that such operations may be performed by different components and/or different combinations of components. Moreover, some operations may be executed at the instruction of and/or by the processor 141. Further, it should be understood that one or more of the operations below may be performed concurrently and/or in an order different than the order presented below. Additionally, in various embodiments, one or more of the following operations may be omitted, and/or additional operations may be added.

In step 301, computation platform 203, receives, via Kalman filter 207, an estimation from a previous instance of time (e.g., from a previous iteration of the method 300). In one instance, the estimation includes one or more initial estimated inside temperature(s), an initial estimated outlet temperature, or a combination thereof of an A/T catalyst. In one instance, Kalman filter 207 includes an extended Kalman filter (EKF), an UKF, or a Linear Kalman Filter (LKF).

In step 303, computation platform 203 generates a plurality of sigma points around the received estimation from the previous instance of time. In one instance, the UKF may include a deterministic sampling technique UT to pick a minimal set of sample points, i.e., sigma points, around one or more mean nonlinear functions. The sigma points may be propagated through the non-linear functions, from which the mean and covariance of the estimates may be recovered. The resulting filter may more accurately capture the true mean and covariance, e.g., matrix covariances P, of the overall system being modeled.

In step 305, computation platform 203, inputs, e.g., in real-time, the plurality of sigma points into simulation model 201 to calculate respective outputs for a current instance of time. In one instance, simulation model 201 is a catalyst thermal model. In one instance, the output for each respective input sigma point includes one or more first inside temperature(s), a first outlet temperature, or a combination thereof of the A/T catalyst.

In step 307, computation platform 203, calculates a mean and a covariance from the output. Computation platform 203 compares the sensor measurement covariance against the mean and the covariance of the output to update the Kalman filter gain and a process covariance. A measurement noise, a disturbance uncertainty, a state process uncertainty, or a combination thereof is quantified by a matrix covariance for calculating and updating the Kalman filter gain. For example, Kalman filtering techniques involve quantifying the measurement noise by a matrix covariance R, the disturbance uncertainty by a matrix covariance Q, and the state process uncertainty by a matrix covariance P. In one instance, simulation model 201 may receive sensor measurements from machine 101 that may give state variable x, and matrix covariance R gives a distribution of values from the sensor measurements, i.e., around x. In another instance, simulation model 201 may predict state variable $\hat{x}$, and P and Q are matrix covariance that give a distribution of values around $\hat{x}$. Thereafter, calculate a Kalman gain, e.g., $x_{est}$, based on the comparison between the state variable and the matrix covariances. These matrix covariances may be used to estimate the correlation of noise and interference, e.g., noise and interference may be suppressed by determining weighting factors based on the matrix covariance. In one aspect, matrix covariance P, Q, and R are estimated to determine a weight factor between the measurements and the model. The mean and covariance of the weighted points need to equal the mean and the covariance of the point selected in the UKF.

In step 309, computation platform 203, calculates a weighted average between the sensor measurement(s) and the mean of the output to generate the second estimation for the next instance of time, wherein weight is based on the Kalman filter gain. In one instance, the second estimation includes one or more second estimated inside temperature(s), a second estimated outlet temperature, or a combination thereof of the A/T catalyst. The second estimation may be used as a feedback temperature in a close-loop control system to control the mass flow rate of fuel in the diesel engine during the regeneration process of an exhaust treatment system. In one instance, the one or more second estimated inside temperature(s) indicate the temperature within a catalyst brick in the next instance of time.

Figure 4:
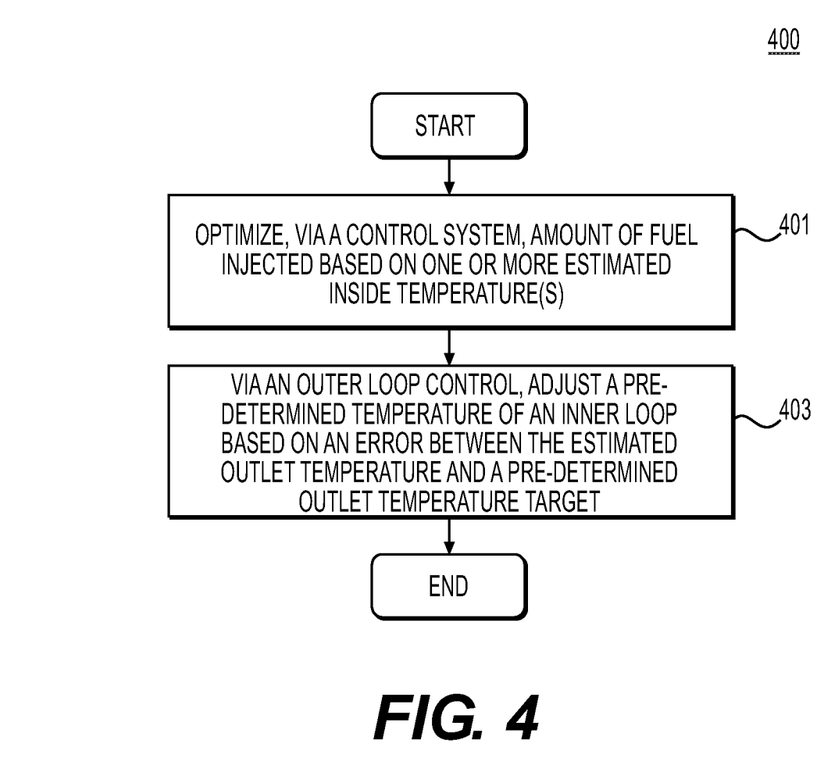
FIG. 4 is a flowchart of a method for controlling the temperature and the quantity of fuel for an engine, according to aspects of the present disclosure.

FIG. 4 is a flowchart illustrating an exemplary method 400 for operating machine 101 according to one or more embodiments of this disclosure.

In step 401, engine controller 135, may optimize, via control system 109, a regeneration process of the diesel engine based on the one or more estimated inside temperature(s). In one instance, the one or more estimated inside temperature(s) may be used as feedback to control the quantity of fuel injected into the DOC at the next instance of time. For example, the fuel may be injected late in an expansion stroke of the diesel engine to produce heat for regenerating of any after-treatment system, e.g. DPF, DOC, SCR, mixer, pipe, and so on, may be injected via an injector into an exhaust stream, or may be introduced by any other suitable manner to raise the temperature of the A/T catalyst.

In step 403, engine controller 135, may adjust a pre-determined temperature of an inner loop via an outer loop control based, at least in part, on an error between the estimated outlet temperature and a pre-determined outlet temperature target. In one instance, the inner loop may use the Kalman filter corrected prediction of the internal brick against an internal brick temperature target, and the outer loop may compare the Kalman filter corrected prediction of the outlet temperature with the regeneration temperature target to ensure regeneration is achieved.

One or more embodiments of this disclosure may improve temperature control in an engine that comprises catalysts with heavier thermal mass. One or more embodiments of this disclosure may prevent unstable regeneration that may result in blazing temperatures that damage the DPF filter or any exhaust devices. One or more embodiments of this disclosure may improve the operation of a machine by eliminating lagging sensor measurement that negatively impacts the stability of a controller.

It should be understood that while some of the embodiments above include a Kalman filter estimation for the one or more inside temperature(s) of a catalyst, Kalman filter estimation may be used for any suitable operating condition or combination of operating conditions.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A computer-implemented method for controlling a regeneration process of an after-treatment (NT) catalyst of a diesel engine, the method comprising:
receiving, via a Kalman filter, an initial temperature estimation of the A/T catalyst from a previous instance of time, the initial temperature estimation including one or more first estimated inside temperatures and/or a first estimated outlet temperature of the A/T catalyst;
generating an output from a simulation model based on the initial temperature estimation so as to calculate a mean and a covariance of the output;
comparing a sensor measurement covariance against the mean and the covariance of the output so as to update a Kalman filter gain and a process covariance;
calculating a weighted average between sensor measurements and the mean of the output based on the Kalman filter gain so as to generate a second temperature estimation of the A/T catalyst for a next instance of time, the second temperature estimation including one or more second estimated inside temperatures and/or a second estimated outlet temperature of the A/T catalyst; and
executing the regeneration process based on the second temperature estimation, the regeneration process including controlling, a quantity of fuel introduced into the A/T catalyst via a closed loop control system.

2. The computer-implemented method according to claim 1, wherein the generating of the output further includes:
inputting, in real-time, a plurality of sigma points into the simulation model based on the initial temperature estimation so as to calculate the output for a current instance of time.

3. The computer-implemented method according to claim 1, wherein:
the second temperature estimation includes the one or more second estimated inside temperatures, and
the A/T catalyst comprises a fuel burning catalyst including a diesel oxidation catalyst (DOC).

4. The computer-implemented method according to claim 3, wherein the regeneration process further includes:
injecting the quantity of fuel late in an expansion stroke of the diesel engine so as to produce heat in the fuel burning catalyst, or
injecting the quantity of fuel directly into an exhaust stream of the diesel engine via a secondary fuel injector so as to produce heat in the fuel burning catalyst.

5. The computer-implemented method according to claim 1, wherein:
the second temperature estimation includes the one or more second estimated inside temperatures and the second estimated outlet temperature, and
the closed loop control system is configured to adjust the one or more second estimated inside temperatures toward a target internal brick temperature based, at least in part, on an error between the second estimated outlet temperature and a target regeneration outlet temperature.

6. The computer-implemented method according to claim 1, wherein the simulation model is a catalyst thermal model.

7. The computer-implemented method according to claim 1, wherein the updating of the Kalman filter gain further includes a matrix covariance configured to quantify at least one of: a measurement noise, a disturbance uncertainty, or a state process uncertainty.

8. The computer-implemented method according to claim 1, wherein the one or more first estimated inside temperatures and/or the one or more second estimated inside temperatures indicate a temperature within a catalyst brick of the A/T catalyst.

9. The computer-implemented method according to claim 1, wherein the Kalman filter includes an extended Kalman filter (EKF), an unscented Kalman filter (UKF), or a Linear Kalman Filter (LKF).

10. The computer-implemented method according to claim 1, wherein the sensor measurements are received via a temperature sensor located at an inlet and/or an outlet of the A/T catalyst.

11. An engine control system for an engine, the engine control system comprising:
a temperature sensor configured to sense an inlet temperature and an outlet temperature of an after-treatment (A/T) catalyst; and
an engine controller operatively connected to the temperature sensor, and including:
a memory, storing:
one or more instructions configured to control a regeneration process of the A/T catalyst; and
a processor operatively connected to the memory, the processor configured to execute the regeneration process based on the one or more instructions,
wherein the engine controller is configured to:
receive in real-time, via a Kalman filter, an initial temperature estimation of the A/T catalyst from a previous instance of time, the initial temperature estimation including one or more first estimated inside temperatures and/or a first estimated outlet temperature of the A/T catalyst;
generate an output from a simulation model, in response to the initial temperature estimation, so as to calculate a mean and a covariance of the output;
compare sensor measurement covariance of the temperature sensor against the mean and the covariance of the output so as to update a Kalman filter gain and a process covariance;
calculate a weighted average between sensor measurements of the temperature sensor and the mean of the output based on the Kalman filter gain so as to generate a second temperature estimation of the A/T catalyst for a next instance of time, the second temperature estimation including one or more second estimated inside temperatures and/or a second estimated outlet temperature of the A/T catalyst; and
execute the regeneration process in response to the second temperature estimation, the regeneration process including controlling a quantity of fuel introduced into the A/T catalyst via a closed loop control system.

12. The engine control system of claim 11, wherein the generating of the output further includes:
inputting, in real-time, a plurality of sigma points into the simulation model based on the initial temperature estimation so as to calculate the output for a current instance of time.

13. The engine control system of claim 12, wherein:
the second temperature estimation includes the one or more second estimated inside temperatures, and
the A/T catalyst comprises a fuel burning catalyst including a diesel oxidation catalyst (DOC).

14. The engine control system of claim 13, wherein the regeneration process further includes:
- injecting the quantity of fuel late in an expansion stroke of the engine so as to produce heat in the fuel burning catalyst, or
- injecting the quantity of fuel directly into an exhaust stream of the engine via a secondary fuel injector so as to produce heat in the fuel burning catalyst.

15. The engine control system of claim 11, wherein:
- the second temperature estimation includes the one or more second estimated inside temperatures and the second estimated outlet temperature, and
- the closed loop control system is configured to adjust the one or more second estimated inside temperatures toward a target internal brick temperature based, at least in part, on an error between the second estimated outlet temperature and a target regeneration outlet temperature target.

16. The engine control system of claim 11, wherein the simulation model is a catalyst thermal model.

17. An engine system for a vehicle, the engine system comprising:
- a diesel engine;
- an exhaust treatment system including:
  - a diesel oxidation catalyst (DOC) and a diesel particulate filters (DPF); and
  - one or more temperature sensors operatively connected to an inlet and an outlet of the DOC and the DPF; and
- an engine controller including:
  - a memory including instructions configured to control the diesel engine and a regeneration process of the exhaust treatment system; and
  - a processor operatively connected to the memory, the processor configured to execute the controlling of the engine and the regeneration process based on the instructions,
- wherein the engine controller is configured to:
  - receive, via a Kalman filter, an initial temperature estimation of the exhaust treatment system from a previous instance of time, the initial temperature estimation including one or more first estimated inside temperatures and/or a first estimated outlet temperature of the exhaust treatment system;
  - generate an output from a simulation model based on the initial temperature estimation so as to calculate a mean and a covariance of the output;
  - compare sensor measurement covariance of the one or more temperature sensors against the mean and the covariance of the output so as to update a Kalman filter gain and a process covariance;
  - calculate a weighted average between sensor measurements of the one or more temperature sensors and the mean of the output based on the Kalman filter gain so as to generate a second temperature estimation of the exhaust treatment system for a next instance of time, the second temperature estimation including one or more second estimated inside temperatures and/or a second estimated outlet temperature of the exhaust treatment system; and
  - execute the regeneration process based on the second temperature estimation, the regeneration process including controlling, a quantity of fuel introduced into the exhaust treatment system via a closed loop control system.

18. The engine system according to claim 17, wherein the generating of the output further includes:
- inputting, in real-time, a plurality of sigma points into the simulation model based on the initial temperature estimation so as to calculate the output for a current instance of time.

19. The engine system according to claim 18, wherein:
- the second temperature estimation includes the one or more second estimated inside temperatures, and
- the DOC and the DPF are fuel burning catalysts.

20. The engine system according to claim 19, wherein the regeneration process further includes:
- injecting the quantity of fuel late in an expansion stroke of the diesel engine so as to produce heat in the fuel burning catalysts, or
- injecting the quantity of fuel directly into an exhaust stream of the diesel engine via a secondary fuel injector so as to produce heat in the fuel burning catalysts.

* * * * *